Oct. 23, 1951     E. J. GALLOWAY     2,572,131
STRAINER
Filed Sept. 21, 1950
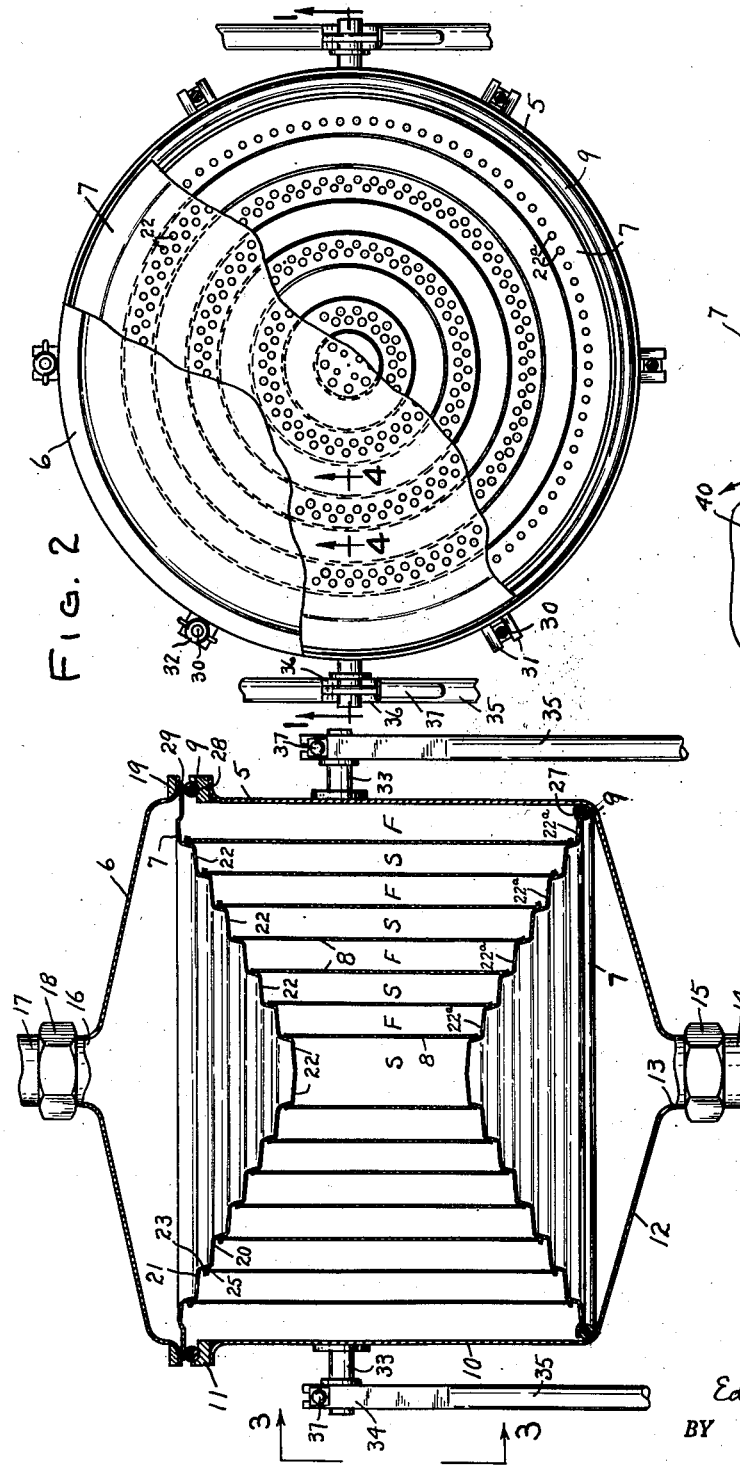
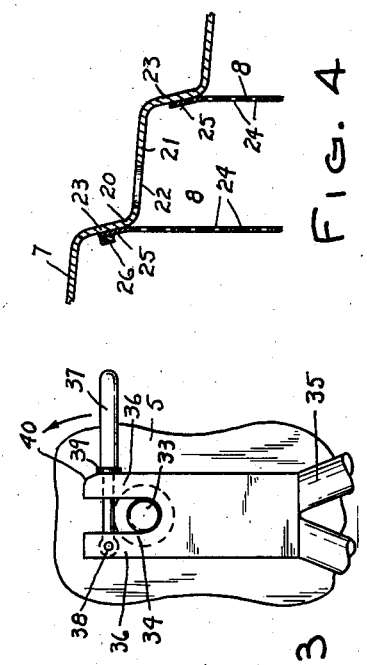
INVENTOR.
Edwin J. Galloway
BY Charles D. French
Atty's.

Patented Oct. 23, 1951

2,572,131

UNITED STATES PATENT OFFICE 2,572,131

STRAINER

Edwin J. Galloway, Neenah, Wis., assignor to Neenah Milk Products Company, Neenah, Wis., a corporation of Wisconsin Application September 21, 1950, Serial No. 186,006

4 Claims. (Cl. 210—184)

The invention relates to strainers for straining various products and especially viscous food products such as condensed milk, sweetened condensed milk, sour cream, vegetable juices, and fruit juices.

The main object of the invention is to provide a strainer of large capacity in which the parts are formed to permit ready cleaning and inspection and assembly and disassembly.

A further object of the invention is to provide a strainer of the type above described having a trunnion bearing mounting on a supporting standard, so that after straining the strainer may be charged with a caustic cleaning solution and rocked back and forth to loosen strained material adhering to the strainer elements preparatory to separately cleaning these elements.

The invention further consists in the several features hereinafter set forth and more particularly defined by claims at the conclusion hereof.

In the drawings:

Fig. 1 is a vertical sectional view taken on the line 1—1 of Fig. 2 through a strainer embodying the invention, parts being broken away;

Fig. 2 is a plan view of the strainer;

Fig. 3 is a detailed side view of a portion of the strainer as viewed along the line 3—3 of Fig. 1;

Fig. 4 is an enlarged detailed vertical sectional view taken on the line 4—4 of Fig. 2.

Referring to the drawings, the strainer comprises a container 5, a removable cover 6, partition members 7, tubes 8, sealing rings 9, means for clamping the cover and other removable parts in fluid sealed relation relative to the container, and means for supporting the container.

The container 5 is of stainless steel having a cylindrical side wall 10 provided with a flanged ring-reinforced top edge 11 and having a conical bottom 12 provided with an outlet opening 13 which may be connected to a discharge pipe 14 by a suitable coupling 15.

The cover 6 of stainless steel is of conical form having a central opening 16 which may be connected to an inlet or supply pipe 17 by a suitable coupling 18. The rim of the cover is provided with a reinforcing metal ring 19.

Each of the partition members 7 are formed of stainless sheet steel and are of generally conical shape and formed to provide a series of annular step portions 20. The bottoms 21 of alternate step portions 20 are provided with rows of holes which on the upper partition form inlets 22 and on the lower partition form outlets 22a, the outlets 22a being offset one step from the inlets 22. The back 23 of each step portion is inclined or outwardly tapered.

Each tube 8, of stainless sheet steel, is of cylindrical form and provided throughout its length with a number of small filtering perforations 24 which are indicated in Fig. 4. The ends 25 of each tube are outwardly flared or tapered so as to tightly fit the tapered backs of the steps of the partitions when said partitions and tubes are pressed together into the assembled relation shown in Fig. 1 by the clamping pressure exerted through the cover. The larger of the tubes 8 may also have reinforcing edge rings 26.

The sealing rings 9 of rubber or other suitable yieldable packing material are interposed between the container and the partitions. The lower of the rings 9 seats within the container at the junction between its sides and bottom, and the rim 27 of the lower partition 7 rests on the top of said ring. The upper of the rings 9 seats in a groove 28 in the top edge or rim of the container and the rim 29 of the upper partition rests on the top of said ring. The cover 6, when in place, engages at its rim with the rim 29 of the upper partition, and when clamping pressure is applied to the cover, the rings 9 are compressed to form a tight seal between the engaged parts, and at the same time the partitions 7 are brought into sealing contact with the ends of the tubes 8.

Any suitable cover clamping means may be used, and by way of example I have shown clamping bolts 30 carried by the container 5 and passing through forked extensions 31 of the cover and provided with wing nuts 32 for engaging said extensions and pressing down on said cover. For ready removal, the clamping bolts 30 are usually pivotally anchored to the flanged rim of the container 5.

The strainer may be mounted on any suitable support but in the present instance is shown as provided with diametrically disposed trunnions 33 which engage in the forked ends 34 of uprights or legs forming parts of the support. For holding the container in any desired set position, the trunnions may be clamped between the sides 36 of the forks by means for drawing these sides toward each other, as for example, a clamping lever 37 pivotally anchored at 38 to one of the bifurcated sides of the fork and passing through the bifurcated or slotted other side of this fork and provided with shoes or a shouldered portion 39 which in riding over a cam surface 40 acts to force this side inwardly and thereby pinch the trunnion between the sides of the fork. The strainer is held in a fixed position during the straining operation while coupled to the inlet and discharge piping. Thereafter, the couplings 15 and 18 are released, and either end of the container is plugged by a suitable cap and the container then charged from its open end with a suitable caustic solution. The charged container is then rocked back and forth on its trunnions, so that the solution may loosen the strained material from the tubes and the partitions and thus facilitate the subsequent cleaning of the individual parts when the cover is taken off and the separable parts removed. The pivotal mounting of the strainer as above described also permits it to be inverted for back flushing.

With the above construction, the product to be strained flows from a place of supply through the pipe 17 and opening 16 into the top of the container and then through the holes 22 in the upper partition 7 into alternate spaces S between the tubes 8, and it is then strained through the finer perforations 24 into the other spaces F from which it flows through the holes 22a in the lower partition into the bottom of the container 5 and then through the opening 13 into the discharge pipe 14. The sediment in the spaces S held back by the perforations tends to be drawn to the bottom of these spaces by the force of gravity as the strained product flows through the perforations. Thus the spaces S gradually fill up with sediment.

The conical formation of the partition members 7 provides large flow spaces at the top and bottom portions of the container.

The strainer is sanitary and easily assembled, and each of the parts may be readily cleaned.

I desire it to be understood that this invention is not to be limited to any particular form or arrangement of parts except insofar as such limitations are included in the appended claims.

What I claim as my invention is:

1. In a strainer, the combination of a container, a removable cover for said container, a partition member adjacent the bottom of the container, a partition adjacent the top of said container, each of said partition members comprising a conically shaped member having annular step portions, the bottoms of alternate stepped portions having apertures therein, the apertures of one member being offset one step from those of the other member, a series of perforated tubes having their ends contacting the backs of said step portions in sealed relation therewith, means for clamping said tubes between said partition members, and means for clamping said partition members in sealed relation with the interior of said container.

2. The strainer structure as defined in claim 1 in which the ends of the tubes and backs of said step portions have tapered fit contact with each other.

3. The strainer structure as defined in claim 1 in which the means for clamping the partition members in sealed relation with the interior of said container include compressible rings seated at the top and bottom of the container and on which said partition members seat.

4. In a strainer, the combination of a container, a removable cover for said container, a compressible sealing member seating on the bottom of the container and in contact with the side wall thereof, a partition member seating on said sealing member, a compressible sealing member seating on the top edge of the container, a partition member having its rim engaging said last named sealing member, each of said partition members having annular step portions, the bottoms of alternate step portions having apertures therein, the apertures of one partition member being offset one step from those of the other member, a series of perforated tubes having their ends contacting the backs of said step portions, and means for clamping the cover against the upper partition member, said cover in clamped position acting to compress said sealing members and draw said partition members and tubes into sealing contact.

EDWIN J. GALLOWAY.

REFERENCES CITED

The following references are of record in the file of this patent:

UNITED STATES PATENTS

| Number | Name | Date |
|--------|------|------|
| 446,342 | Goodacre | Feb. 10, 1891 |
| 590,968 | Davis | Oct. 5, 1897 |
| 1,563,904 | Kerckhoff et al. | Dec. 1, 1925 |
| 1,737,313 | Kamrath | Nov. 26, 1929 |
| 2,750,935 | Maunula et al. | Mar. 18, 1930 |
| 2,496,370 | Baily | Feb. 7, 1950 |